United States Patent [19]

Scharfe, Jr.

[11] 4,415,964

[45] Nov. 15, 1983

[54] POWER SUPPLY

[76] Inventor: James A. Scharfe, Jr., 344 Camino Del Cielo, South Pasadena, Calif. 91030

[21] Appl. No.: 335,059

[22] Filed: Dec. 28, 1981

[51] Int. Cl.³ ............................................. H02M 1/10
[52] U.S. Cl. .................................................. 363/142
[58] Field of Search ...................... 307/17, 29, 37, 71, 307/128; 318/111, 440–442; 363/142, 143

[56] References Cited

U.S. PATENT DOCUMENTS

| 2,807,766 | 9/1957 | Moody et al. | 318/442 X |
| 3,815,009 | 6/1974 | Berger | 363/142 X |
| 3,855,521 | 12/1974 | Kiuchi | 307/17 X |

Primary Examiner—William M. Shoop

[57] ABSTRACT

A power supply which automatically produces approximately the same output voltage from two or more input voltages where the input voltages have substantially different magnitudes.

30 Claims, 6 Drawing Figures

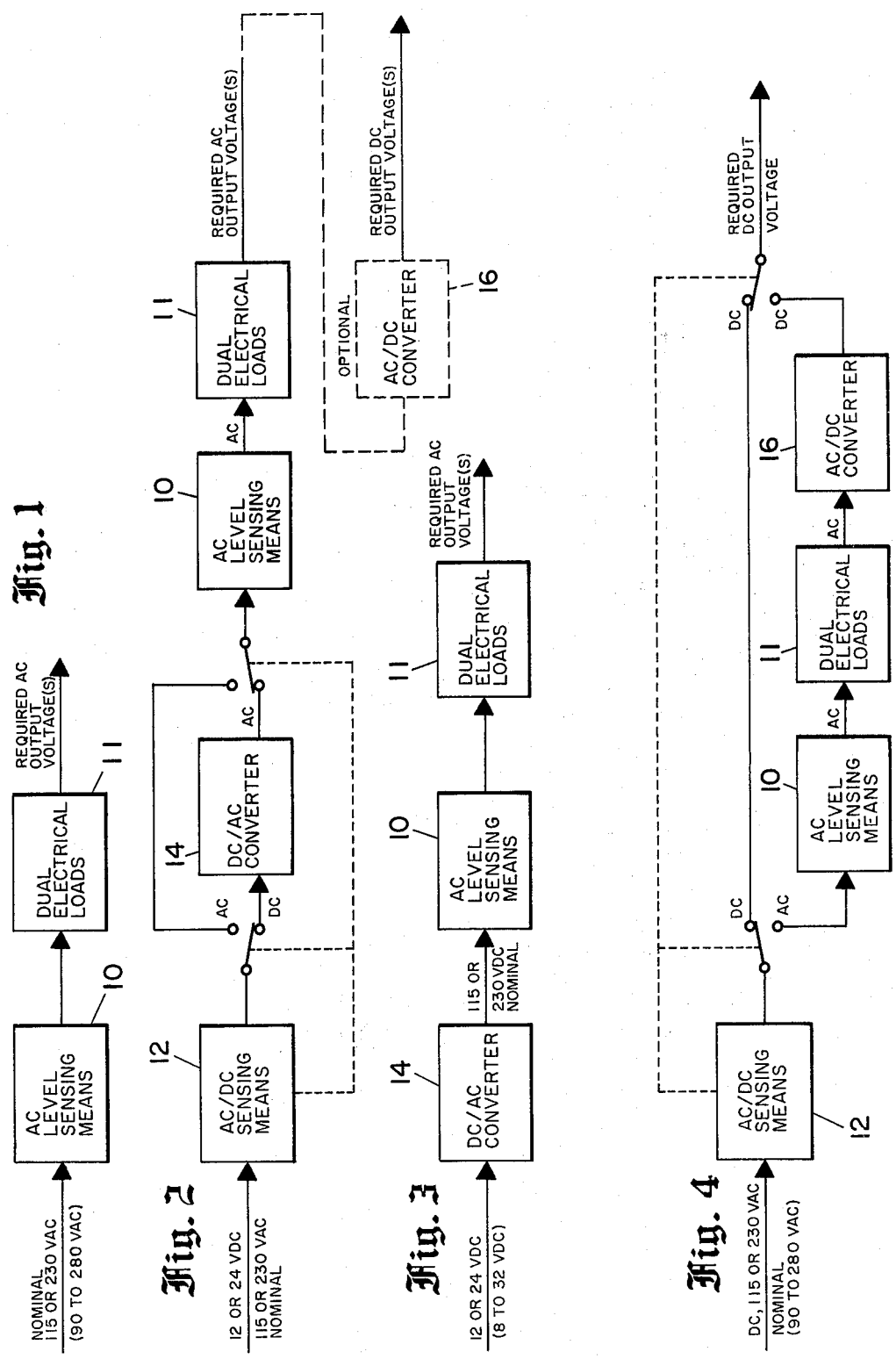

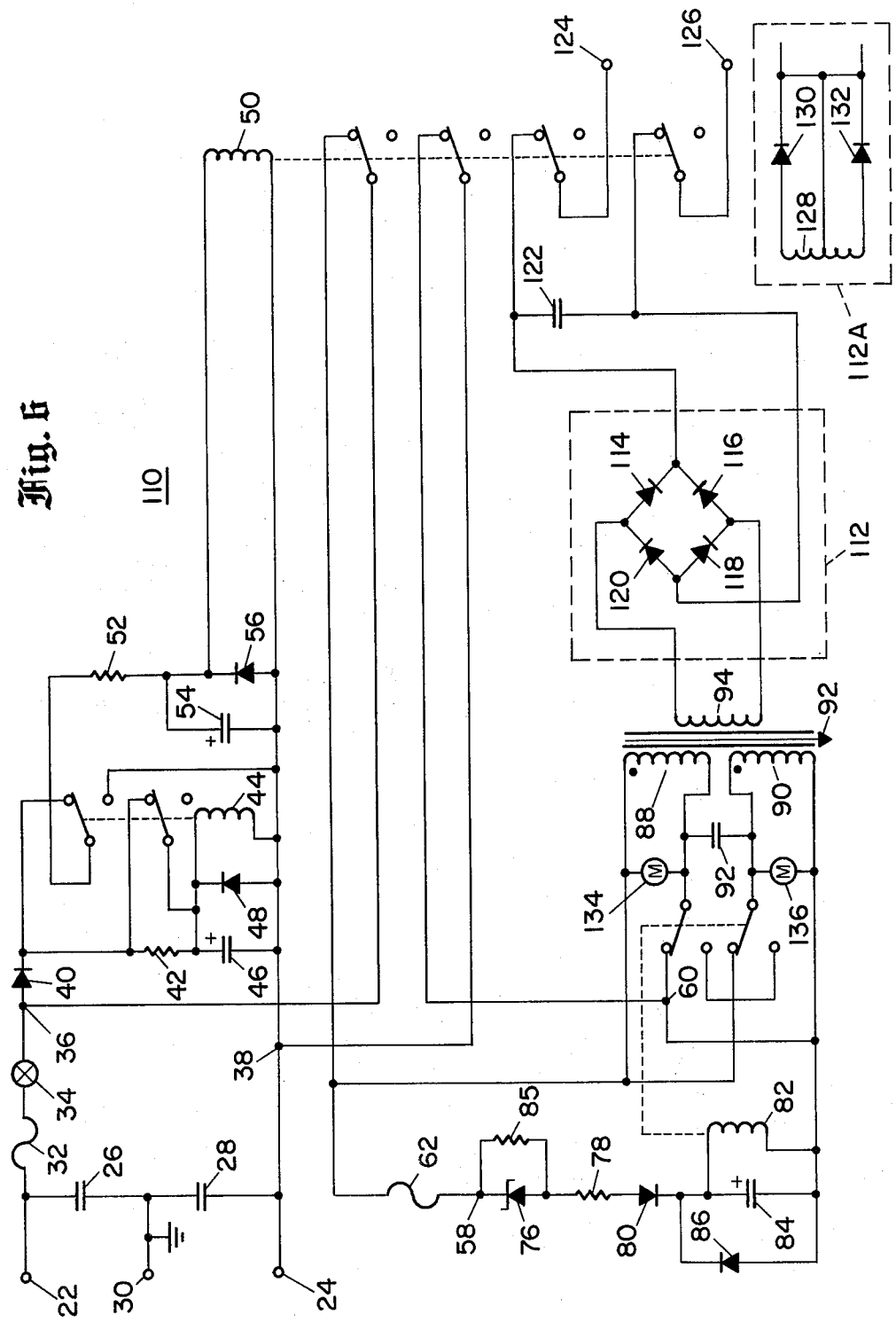

POWER SUPPLY

BACKGROUND OF THE INVENTION

Most electronic equipment is manufactured to operate on an AC voltage, usually either 115 volts AC or 230 volts AC. If it is desired to operate electronic equipment from a power source having a voltage level other than the level at which the device is intended to operate, it has heretofore been necessary to use an external step-down/step-up transformer accessory. Many equipments are designed to operate from either 115 volts AC or 230 volts AC but an operator must set a mechanical switch in the correct position. If the switch is not set for the proper voltage level, there can, of course, be damage to the equipment.

Some electronic equipments are manufactured to operate on DC voltages, usually either 12 volts DC or 24 volts DC. For example, electronic equipments intended for use in land, mobile, or maritime operation in small vessels are usually designed to operate on a DC voltage. The voltage available at most repair facilities is, however, an AC voltage, usually 115 volts AC or 230 volts AC. In order to repair and test such DC equipment, it has heretofore been necessary to have a separate DC power supply for converting a AC source voltage to the required DC voltage.

SUMMARY OF THE INVENTION

The above and other disadvantages of the prior art are overcome by the device of the invention which produces an output voltage of approximately 115 volts AC from an input voltage which may be either 115 volts AC or approximately 230 volts AC. The device senses the input voltage to determine if its magnitude is within a first or a second range of voltages. A plurality of electrical loads all windings are connected in parallel with the input voltage whenever the sensed input voltage has a magnitude within the first range of voltages, for example, 115 volts AC, and connected in series with the input voltage whenever the sensed input voltage is within a second range of voltages, for example, 230 volts AC. The electrical loads may comprise a pair of primary windings of a power transformer. Switching primary windings to a parallel connection when the input voltage is approximately 115 volts AC and to a series connection when the input voltage is approximately 230 volts AC will result in a substantially constant output voltage being induced in secondary windings of the power transformer. Of course, the loads need not be limited to primary windings. Any combination of any pair of loads having substantially the same impedance may be switched in this manner. Thus an output voltage within the first range of voltages is produced whether the input voltage is 115 volts AC or 230 volts AC. For input voltages of approximately 115 volts AC and 230 volts AC the first range of voltages will typically extend from approximately 90 volts AC to approximately 140 volts AC and the second range from approximately 180 volts AC to approximately 280 volts AC. In a more universal embodiment an additional sensing means determines whether the input voltage is a AC or a DC voltage and a converting means converts any DC input voltage to an AC voltage. The AC level sensing means senses either an AC input voltage or a converted AC voltage to determine whether its magnitude is within a first or second range of AC voltages. Thus, a relatively constant AC output voltage is supplied from a 115 volts AC input voltage, a 230 volts AC input voltage, or a DC input voltage. The DC input voltage would typically be either approximately 12 volts DC or 24 volts DC. A 24 volt DC input voltage would be converted to approximately 230 volts AC which would, in turn, be sensed as an AC voltage in the second range of voltages. The primary windings of a power transformer load would then be connected in series to maintain an output voltage of approximately 115 volts AC. Other types of electrical loads include but are not limited to motors, light bulbs and heating elements.

In another embodiment the same additional sensing means determines whether the input voltage is a AC or a DC voltage. A switching means connects a sensed DC input voltage to a pair of output terminals or connects a sensed AC input voltage to the means for sensing the magnitude of an AC voltage (whether the AC voltage is in the first or second range of voltages). An additional AC to DC converter converts a sensed AC input voltage to a converted DC output voltage. The switching means connects either a DC input voltage to a pair of output terminals or, in the case of an AC input voltage, connects the converted DC voltage to the output terminals.

The scope of the invention includes a method for producing an output voltage which is within a first range of voltages from an input voltage which is within a first range of voltages or within a second range of voltages. In a first step in the basic method the input voltage is sensed to determine if its magnitude is within the first or second range of voltages. Then a plurality of devices for transferring electrical energy is connected either in parallel with the input voltage whenever the sensed input voltage has a magnitude within the first range of voltages or in series with the input voltage whenever the sensed input voltage is within the second range of voltages. The plurality of devices produce the required output voltage.

BRIEF DESCRIPTION OF THE DRAWINGS

FIG. 1 is a block diagram of an embodiment for producing one or more required AC output voltages from an input voltage which is within either a first or a second range of input voltages.

FIG. 2 is a block diagram of another embodiment of the invention for producing one or more required AC output voltages from either a DC input voltage or from an AC input voltage which is within either a first or a second range of AC input voltages.

FIG. 3 is a block diagram of yet another embodiment of the invention for producing one or more required AC output voltages from either one of two DC input voltages.

FIG. 4 is a block diagram of yet another embodiment of the invention for producing a required DC output voltage from a DC input voltage or from an AC input voltage which is either in a first or a second range of AC input voltages.

FIG. 6 is a schematic diagram of the embodiment shown in FIG. 4.

DESCRIPTION OF THE EMBODIMENTS

Figure 5:
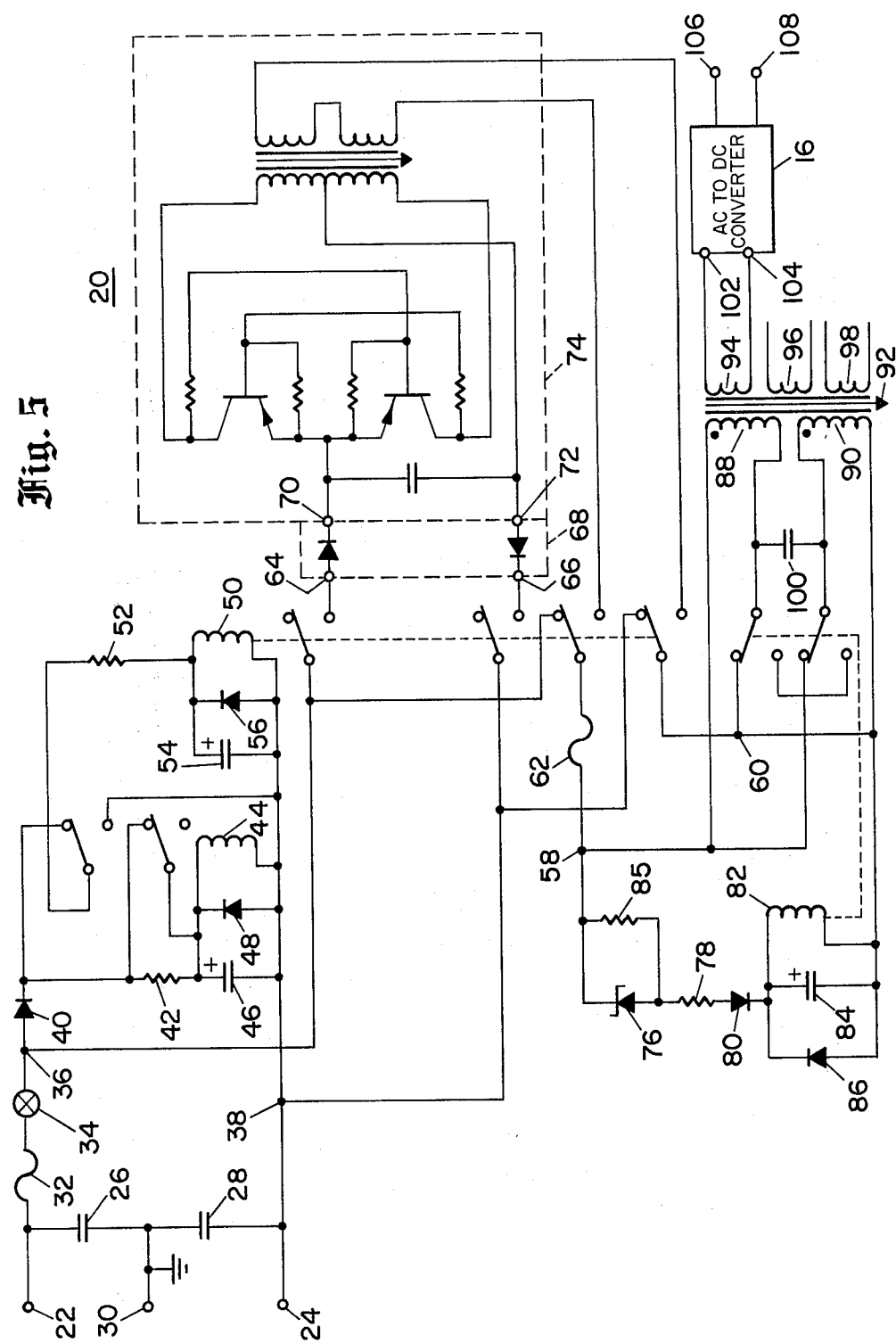
FIG. 5 is a schematic diagram of the embodiment shown in FIG. 2.

In FIG. 1 there is shown a block diagram of an embodiment for producing one or more AC output voltages from an input voltage which may be either in a first or a second range of AC input voltages. For example, nominal 115 volts AC and nominal 230 volts AC are in common usage around the world. In this example the two ranges may extend from 90 to 280 volts AC. AC level sensing means 10 detects which of the two AC input voltages is received. To produce the required AC output voltage means 10 switches the primary windings of dual electrical loads 11 in parallel whenever 115 volts AC is received and in series whenever 230 volts AC is received. Dual electrical loads may comprise a pair of primary windings of a power transformer as shown in FIGS. 5 and 6 and discussed below. They may also comprise any other electrical loads having approximately the same impedances. Some examples are motors, light bulbs, and heating elements. In electrical equipment it would be advantageous to have a combination of electrical loads such as dual primary windings and a pair of fan motors. Thus, in this example, a nominal 115 volts AC output voltage is produced when either 115 volts AC or 230 volts AC input voltage is received.

The embodiment of FIG. 2 includes AC level sensing means 10 and dual primary transformer 11 which operate in the manner described for FIG. 1. In addition, the embodiment of FIG. 2 will produce the required AC output voltage from a DC input voltage. AC/DC sensing means 12 receives either a nominal 115 volts AC or a nominal 230 volts AC or a nominal 12 volts DC or a nominal 24 volts DC. Means 12 senses between an AC input voltage or a DC input voltage. An AC input voltage is coupled directly to AC level sensing means 10. A DC input voltage is first coupled to DC/AC converter 14. Converter 14 converts the DC input voltage to an AC voltage which is in turn coupled to AC level sensing means 10. In this embodiment a 12 volt DC input voltage will be converted to a nominal 115 volts AC and a 24 volt DC input voltage will be converted to a nominal 230 volts AC. Thus the input voltages to AC level sensing means 10 have substantially the same magnitudes whether the voltages are coupled directly from AC/DC sensing means 12 or from DC/AC converter 14. If there is a requirement for a DC output voltage optional AC/DC converter 16 may be utilized to convert the AC output voltage from transformer 11 to the required DC voltage.

The embodiment of FIG. 3 is a simplified version of the embodiment shown in FIG. 2, which operates on a pair of DC input voltages to produce one or more required AC output voltages. The components of this embodiment, DC/AC converter 14, AC level sensing means 10 and dual primary transformer 11, are all included in the embodiment shown in FIG. 2 and the operation thereof is discussed above with respect to FIGS. 1 and 2.

The embodiment of FIG. 4 differs from the embodiments of FIGS. 1-3 in that it produces a required DC output voltage rather than an AC output voltage. Either a DC input voltage or an AC input voltage in either a first or a second range of AC input voltages is received by AC/DC sensing means 12. The DC input voltage is coupled by AC/DC sensing means 12 directly to the output. An AC input voltage is coupled by means 12 to AC level sensing means 10. As discussed above, AC level sensing means 10 will apply a 115 volts AC input voltage to the dual primary windings of transformer 11 in parallel. It will also connect these dual primary windings of transformer 11 in series whenever an input voltage of 230 volts AC is received by means 12. Thus substantially the same AC voltage is applied to AC/DC converter 16 whether the input voltage is 115 volts AC or 230 volts AC. Converter 16 is designed to produce substantially the same DC output voltage as may be received by AC/DC sensing means 12. For example, if it is intended to apply 12 volts DC to means 12 to obtain a 12 volt DC output voltage, converter 16 is designed to produce a 12 volt DC output voltage from a 115 volt AC input voltage from transformer 11.

DETAILED DISCLOSURE OF TWO EMBODIMENTS OF THE INVENTION

In FIG. 5 there is shown an AC-DC select circuit 20 which produces output voltages which vary over a relatively small range from input voltages which may be either approximately 115 volts AC, 230 volts AC, 12 volts DC or 24 volts DC. The input voltages are received by circuit 20 at terminals 22 and 24. Capacitors 26 and 28 are connected between terminals 22 and 24, respectively, and ground terminal 30. Capacitors 26 and 28 are selected to filter radio frequency noise from the input voltages received at terminals 22 and 24. Fuse 32 is selected to have a rating that will carry both the low alternating current and the higher direct currents. The current will be highest when the lowest voltage is applied to terminals 22 and 24, of course. The circuit is turned on and off by switch 34.

The input voltages are present at junctions 36 and 38 and from there are coupled to a circuit means for sensing between an AC voltage or a DC voltage. The input voltages are also coupled to a circuit means for sensing to determine whether AC voltages are within a first range of voltages or within a second, higher range of voltages. More specifically, circuit 20 is designed to select not only between 115 volts AC and 230 volts AC but also to identify input AC voltages having a magnitude within a lower or a higher range of voltages. A voltage as supplied by commercial power companies varies rather widely with the instant load. The nominal values also vary with the commercial power companies and countries. Thus electronic and electrical devices which are designed to operate within wide geographic areas are usually designed to operate at a minimum over voltage ranges extending from approximately 100 volts to 130 volts or from approximately 200 volts to 260 volts AC. If an AC voltage is received at terminals 22 and 24, it is routed directly to the AC level sensing means for sensing whether its magnitude is within a first range or a second higher range. If a DC voltage is received at terminals 22 and 24, this DC voltage is first converted to an AC voltage and the converted AC voltage is applied to the circuit means for sensing whether it is in the first or second range of AC voltages. The means for converting the DC to an AC voltage is designed to convert DC voltages of approximately 12 volts to an AC voltage having a magnitude within the first range of voltages and to convert DC voltages of approximately 24 volts to an AC voltage having a magnitude within the second range of AC voltages.

The AC/DC sensing means 12 (as shown in FIG. 1) for sensing between an AC or a DC voltage comprises diode 40, resistor 42 and relay 44 in FIG. 5. In the embodiment of circuit 20 these components sense whether the input voltage is a high AC voltage or a low DC voltage. Relay 44 is energized whenever an AC voltage in either the lower or higher range of voltages is received and deenergized when either approximately 12 or 24 volts DC is received. Assume that the input voltage is 115 volts AC. This input voltage is rectified by diode 40 to produce 115 volts DC. This DC voltage energizes relay 44 which is a 110 volts DC double pole, double throw relay. Its coil has a resistance of approximately 15,000 ohms. Resistor 42 has a resistance which is approximately the same magnitude as the impedance of the coil of relay 44. Relay 44 will energize any time the voltage applied to its coil winding exceeds approximately 80 volts DC and will not deenergize until the applied voltage falls below approximately 40 volts DC. Thus 115 volts DC applied through one set of contacts of relay 44 will energize the relay quickly and connect resistor 42 in series with the coil. Since the resistance of resistor 42 and the impedance of the coil of relay 44 approximately equal the voltage across the coil winding will drop to approximately half of the voltage at the output of diode 40 because of the voltage divider action. At half voltages (50 Vac or more) the relay is held energized.

Assume now that the input voltage is 230 volts AC. Now diode 40 produces 230 volts DC which also energizes relay 44 in the same manner as described above. The voltage divider action of resistor 42 drops the voltage across the coil of relay 44 to approximately 115 volts which will not overload or overwork the relay. Thus relay 44 is energized whenever a voltage in the first range of AC voltages such as 115 volts or a voltage in the second range of AC voltages such as 230 volts is applied to input terminals 22 and 24.

Capacitor 46 is connected in parallel with the coil of relay 44 to filter any AC ripple on the voltage applied to the coil. Diode 48 is connected in parallel with the coil of relay 44 to remove any spikes in the voltage generated by the coil when the input voltage is turned off.

The rectified voltage appearing at the output of diode 40 is applied to a second set of contacts of relay 44. Whenever an AC voltage is received relay 44 is energized. In the energized position the set of contacts places a short to ground across the coil of relay 50 through resistor 52. Thus whenever an AC voltage of sufficient magnitude to energize relay 44 is received at terminals 22 and 24, relay 50 is deenergized. When a low DC voltage is received at terminals 22 and 24, the DC voltage is applied through diode 40 and the second set of contacts of relay 44 to the coil winding of relay 50 and resistor 52. Relay 50 is a 12 volt DC, 4 pole, double-throw relay. This voltage is also applied to capacitor 54. Current flowing through resistor 52 charges capacitor 54 to its full value. Relay 50 energizes when the voltage on capacitor 54 reaches about 9 Volts DC in magnitude. The time constant of resistor 52 and capacitor 54 is selected to make relay 50 respond more slowly than relay 44 every time is operates. Diode 56 removes any spikes from the DC voltage applied to the coil of relay 50 when power is turned off.

An AC voltage is present at terminals 58 and 60. This may be the input AC voltage present at terminals 36 and 38 which is applied through two sets of contacts of relay 50 in its deenergized position and through fuse 62. Alternately, if the input voltage is DC, the voltage at terminals 58 and 60 is converted from this DC input voltage. In the event of a DC input voltage is applied to circuit 20, relay 50 will be energized and two sets of its contacts will couple the DC voltage through input terminals 64 and 66 of polarity sensor 68. Polarity detector 68 may be any type of well known polarity protecting device which protects DC to AC converter 74 from damage if the polarity of the DC input voltage is reversed applying a negative voltage to input terminal 22 instead of a positive voltage. Polarity detector 68 may not be needed depending upon the type of device used to convert DC to AC voltage. The output of polarity detector 68 is coupled to input terminals 70 and 72 of DC to AC converter 74. DC to AC converter 74 may be any one of a number of well known such converters.

In the embodiment shown DC converter 74 includes a pair of transisters and associated resistors which comprise a multivibrator for converting the input DC voltage to a squarewave AC voltage. The output of the multivibrator is coupled to the primary winding of a step-up transformer. The repetition rate of the multivibrator is determined by the impedance of the resistors and the inductance of the primary winding. The stepped up output voltage from converter 74 is applied through a pair of energized contacts of relay 50 to terminals 58 and 60. Converter 74 is designed to step-up an input voltage of approximately 12 volts DC to an AC voltage with a magnitude within a first range of AC voltages of approximately 100 to 130 volts AC and to step-up an input DC voltage of approximately 24 volts to an AC voltage within a second range of AC voltages of approximately 200 to 260 volts AC. Thus it is seen that with either a high input AC voltage or a low input DC voltage, the voltages present at terminals 58 and 60 are AC voltages having a magnitude within the first range of AC voltages or within the higher second range of AC voltages.

Next consider in FIG. 5 the detailed circuitry of circuit means 10 (as shown in FIG. 1) for sensing between an AC voltage in the first or second range of AC voltages present at terminals 58 and 60. The AC voltage present at terminals 58 and 60 is applied across a series network comprising Zener diode 76, resistor 78, diode 80, and relay coil 82. Zener diode 76, which in this embodiment is a type 1N4764, drops approximately 100 volts constantly. A portion of the current needed to operate relay 82 flows through parallel resistor 85 thus permitting selection of a Zener diode having a smaller power rating. The resistance of resistor 78 is selected to determine the voltage level between the first lower range of voltages and second higher range of voltages at which level relay 82 will be energized. Diode 80 rectifies the AC voltage to produce a half-wave rectified DC voltage. Relay 82 is a DC relay which is normally energized by 115 volts DC. The circuit could be implemented by using an AC relay but a DC relay is preferred since it is then independent of the frequency of the AC voltage. Capacitor 84 is utilized as a filter capacitor. The function of diode 86 is similar to that of diode 54.

The AC voltage present at terminals 58 and 60 is applied through the two set of contacts of relay 82 to primary windings 88 and 90 of power transformer 92. When relay 82 is deenergized because the voltage at terminals 58 and 60 is in the first lower range of voltage magnitudes, primary windings 88 and 90 of power transformer 92 are connected in parallel by the two sets of contacts of relay 82. When relay 82 is energized because the voltage at terminals 58 and 60 is in the second higher range of voltage levels, for example, 230 volts AC, to primary windings 88 and 90 are connected in series by the two sets of contacts of relay 82. If the two like windings 88 and 90 were not switched from a parallel to a series connection whenever the voltage level at terminals 58 and 60 change from 115 volts AC to 230 volts AC, the voltages across the output windings 94, 96 and 98 of power transformer 92 would substantially double. Since the windings are switched in response to such an increase in voltage magnitudes at terminals 58 and 60, the output voltages across the secondary windings 94, 96 and 98 remain substantially constant. Of course, a change in voltage levels at terminals 58 and 60 from 100 volts to 240 volts AC would not result in contact output voltages across secondary windings 94, 96 and 98. But the output voltages would remain within a range of voltages for which an output load such as an electrical or electronic device having a rectifier circuit could properly operate. Capacitor 100 prevents arcing by the contacts of relay 82 due to reverse voltages caused by the inductive action of the power transformer 92.

Converter 16 may be any appropriate AC to DC converter for converting the AC voltage at terminals 102 and 104 to the DC output voltage present at terminals 104 and 106. It should be noted that, the DC output voltage will not double when either an input AC voltage is changed from approximately 115 volts AC to approximately 230 volts AC or a DC input voltage is changed from approximately 12 volts DC to 24 volts DC. To the contrary the DC output voltage will remain substantially constant in the event of such changes in the magnitude of the input voltage.

In operation circuit 20 produces an AC output voltage which is within a first range of AC voltages from an AC input voltage which is within the first range of voltages or within a second range of AC input voltages or from a DC input voltage in the following manner: the circuit senses between an AC or a DC input voltage; next a DC input voltage is converted to an AC voltage; then either the AC input voltage or the converted AC voltage is sensed to determine if its magnitude is within said first or second range of voltages; and in the next step a plurality of devices for transferring electrical energy is connected in parallel with the sensed AC input voltage or the sensed converted AC voltage whenever the sensed voltage has a magnitude within said first range of voltages and in series with said sensed voltage whenever the sensed voltage has a magnitude within said second range of voltages, the plurality of devices thereby produces an AC output voltage; and lastly, the AC voltage from said plurality of transfer devices is converted to a DC output voltage.

Circuit 110, as shown in FIG. 6, is another embodiment of the invention which also produces output voltages which vary over a relatively small range form input voltages which may be either approximately 115 volts AC, approximately 230 volts AC or a DC voltage. The magnitude of the DC voltage frequently of interest is approximately 12 Volts DC. There are many applications for use of circuit 90 to energize electrical devices which are normally or alternately operated from a battery. Components shown in FIG. 6 as having the same numerals as those in circuit 20, as shown in FIG. 5, are the same and, with the exception of relay 50, have the same function as the components of circuit 20. Components numbered 112 and above are peculiar to circuit 110.

An AC to DC converter 112 converts the AC voltage present at secondary winding 94 to at DC voltage which is coupled to a pair of contacts of relay 50. Winding 94 drives a full-wave recifier bridge comprising diodes 114, 116, 118 and 120. Capacitor 122 is a filter capacitor.

The contacts of relay 50 switch between a DC input voltage and a converted DC voltage from converter 112 whenever the input voltage is an AC voltage. Recall that relay 44 is energized when the input voltage is an AC voltage and deenergized when the input is a DC voltage. Thus an input DC voltage appearing at terminals 12 and 24 will be coupled through the deenergized contacts of relay 50 to output terminals 124 and 126. An AC input voltage of either approximately 115 volts or 230 volts will be coupled through the energized contacts of relay 50 to the means for sensing between an AC voltage in the first or second range. Regardless of which range it is within, an AC output voltage will be present across winding 96, as described above. It will be converted to a DC output voltage by converter 112 and applied to output terminals 124 and 126 through the energized contacts of relay 50.

AC to DC converter 112a is an alternate to converter 112 which utilizes a center tap secondary winding 128 instead of winding 94. Winding 128 drives a half wave rectifier circuit comprising diodes 130 and 132 which produces a DC output voltage. This output voltage is also coupled through the contacts of relay 50 and filter capacitor 122 to output terminals 124 and 126.

Motors 134 and 136 operate on approximately 115 volts AC and are connected in parallel with primary windings 88 and 90, respectively. When approximately 230 volts AC is applied to terminals 58 and 60, motors 134 and 136 are connected in series by the operation of relay 82. When the applied voltage to terminals 58 and 60 is approximately 115 volts AC, motors 134 and 136 are connected in series by the operation of relay 82.

In operation circuit 110 produces a DC output voltage from an input voltage which is within a first range of AC voltages or within a second range of AC input voltages or from a DC input voltage in the following manner: circuit 110 senses between an AC or a DC input voltage; a sensed DC input voltage is coupled to a pair of output terminals; the AC input voltage is sensed to determine if its magnitude is within said first or second range of voltages; and a plurality of devices for transferring electrical energy is connected in parallel with the sensed AC input voltage whenever the sensed voltage has a magnitude within said first range of voltages and in series with said sensed voltage whenever the sensed voltage has a magnitude within said second range of voltages, the plurality of devices thereby produces an AC voltage; the AC voltage from said plurality of transfer devices is converted to a DC voltage; and coupling said converted DC voltage to said pair of output terminals whenever the sensed input voltage is an AC voltage.

I claim:

1. A method for automatically producing an output voltage which is within a first range of voltages from an input voltage which is within the first range of voltages or within a second range of voltages comprising: automatically sensing the input voltage to determine if its magnitude is within said first or second range of voltages; automatically connecting a plurality of electrical loads in parallel with the input voltage whenever the sensed input voltage has a magnitude within said first range of voltages; or automatically connecting said plurality of electrical loads in series with said input voltage whenever the sensed input voltage is within said second range of voltages, said plurality of loads producing an output voltage.

2. The method as claimed in claim 1 wherein said plurality of loads comprises at least four electrical loads, wherein a first pair of said loads are connected in parallel with a second pair of said loads whenever the sensed input voltage has a magnitude within said first range of voltages and wherein said first and said second pairs of said loads are connected in series whenever the second input voltage is within said second range of voltages.

3. The method as claimed in claim 2 wherein said first and second pair of electrical loads each comprise at least one electrical motor and at least one primary winding of a transformer connected in parallel.

4. The method as claimed in claim 1 wherein the input voltage is an AC voltage, wherein said electrical loads comprise at least two primary windings and at least one secondary winding of a transformer, and wherein said primary windings are connected in parallel whenever the input AC voltage has a magnitude within said first range of voltages and connected in series whenever the input AC voltage has a magnitude within said second range of voltages, said secondary winding producing said output voltage.

5. The method as claimed in claim 4 wherein said first range of voltages extends from approximately 90 volts AC to approximately 140 volts AC and wherein said second range of voltages extends from approximately 180 volts AC to approximately 280 volts AC.

6. The method as claimed in claim 4 wherein the input voltage is an AC or a DC voltage and wherein the step of sensing the magnitude of an input voltage is preceded by the steps of sensing between an AC or a DC input voltage and converting a DC input voltage to an AC voltage and wherein either the AC input voltage or the converted AC voltage is sensed to determine its magnitude and wherein the step of connecting a pair of electrical loads connects either the converted AC voltage to said pair of electrical loads whenever the input voltage is a DC voltage or connects an AC input voltage to said pair of electrical leads.

7. The method as claimed in claim 6 wherein the step of connecting a pair of electrical loads is followed by the step of converting the AC voltage from said a secondary winding to a DC output voltage.

8. The method as claimed in claim 4 wherein the input voltage may be either an AC voltage or a DC voltage, wherein the step of sensing the magnitude of an input voltage is preceded by the steps of sensing the input voltage to determine whether it is an AC or a DC input voltage and switching a sensed DC input voltage to a pair of output terminals or switching a sensed AC input voltage to sense its magnitude and wherein the step of connecting a pair of electrical loads is followed by the steps of converting the AC voltage from said secondary winding to a converted DC voltage, and switching said converted DC voltage to said pair of output terminals whenever the second input voltage in an AC voltage.

9. A device for automatically producing an output voltage which is within a first range of voltages from an input voltage which is within the first range of voltages or within a second range of voltages comprising: means for sensing the input voltage to determine if its magnitude is within said first or second range of voltages; and means for automatically connecting a plurality of electrical loads in parallel with the input voltage whenever the sensed input voltage has a magnitude within said first range of voltages and for automatically connecting said plurality of electrical loads in series with said input voltage whenever the sensed input voltage is within said second range of voltages, said plurality of loads producing an output voltage.

10. The device as claimed in claim 9 wherein said plurality of loads comprise at least four electrical loads, wherein a first pair of said loads is connected in parallel with a second pair of said loads whenever the sensed input voltage has a magnitude within said first range of voltages and wherein said first and said second pairs of said loads are connected in series whenever the sensed input voltage is within said second range of voltages.

11. The device as claimed in claim 10 wherein said first and second pair of electrical loads each comprise at least one electrical motor and at least one primary winding of a transformer connected in prallel.

12. The device as claimed in claim 9 wherein the input voltage is an AC voltage, wherein said electrical loads comprise at least two primary windings and at least one secondary winding of a transformer, and wherein said primary windings are connected in parallel whenever the input AC voltage has a magnitude within said first range of voltages and connected in series whenever the input AC voltage has a magnitude within said second range of voltages.

13. The device as claimed in claim 12 wherein said first range of voltages extends from approximately 90 volts AC to approximately 140 volts AC and wherein said second range of voltages extends from approximately 180 volts AC to approximately 280 volts AC.

14. The device as claimed in claim 12 wherein the input voltage is a DC voltage within either a third or a fourth range of DC input voltages and further including means for converting a DC input voltage to an AC voltage, said DC converter converting a DC voltage in said third range to an AC voltage in said first range and converting a DC input voltage in said fourth range to an AC voltage in said second range.

15. The device as claimed in claim 12 wherein the input voltage is an AC or a DC voltage and further including means for sensing the input voltage to determine whether it is an AC or a DC input voltage and means for converting a DC input voltage to an AC voltage and wherein said sensing means senses the AC input voltage or the converted AC voltage to determine its magnitude and wherein said connecting means connects the converted AC voltage to said pair of electrical loads whenever the input voltage is a DC voltage or connects an AC input voltage to said plurality of electrical loads.

16. The device as claimed in claim 15 and further including means for converting the AC voltage from said secondary winding to a DC output voltage.

17. The device as claimed in claim 12 wherein the input voltage may be either an AC voltage or a DC voltage, further including means for sensing the input voltage to determine whether it is an AC or a DC input voltage and means for switching a sensed DC input voltage to a pair of output terminals or switching a sensed AC input voltage to said means for sensing the magnitude of an AC voltage and means for converting the AC voltage from said pair of electrical loads to a DC voltage, said switching means switching said converted DC voltage to said pair of output terminals whenever the sensed input voltage is an AC voltage or switching said DC input voltage to said output terminals.

18. A method for producing an AC output voltage which is within a first range of AC voltages from an AC input voltage which is within the first range of voltages or within a second range of AC input voltages or from a DC input voltage comprising:

sensing the input voltage to determine if it is an AC or a DC voltage, converting a DC input voltage to an AC voltage;

sensing the AC input voltage or the converted AC voltage to determine if its magnitude is within said first or second range of voltages; and connecting a pair of electrical loads in parallel with the sensed AC voltage whenever the sensed voltage has a magnitude within said first range of voltages or in series with said sensed voltage whenever the sensed voltage has a magnitude within said second range of voltages.

19. The method as claimed in claim 18 wherein the step of connecting a plurality of devices for transferring electrical energy is followed by the step of converting the AC voltage from said electrical loads to a DC output voltage.

20. A method for producing a DC output voltage from an input voltage which is within a first range of AC voltages or within a second range of AC input voltages or from a DC input voltage comprising:

sensing the input voltage to determine whether it is an AC or a DC voltage;

coupling a sensed DC input voltage to a pair of output terminals;

sensing the AC input voltage to determine if its magnitude is within said first or second range of voltages; and connecting a pair of electrical loads in parallel with the sensed AC voltage whenever the sensed AC voltage has a magnitude within said first range of voltages and in series with said sensed voltage whenever the sensed voltage has a magnitude within said second range of voltages; said pair of electrical loads producing an AC voltage;

converting the AC voltage from said pair of electrical loads to a DC voltage; and coupling said converted DC voltage to said pair of output terminals whenever the sensed input voltage is an AC voltage.

21. A device for producing an AC output voltage which is within a first range of AC voltages from an AC input voltage which is within the first range of voltages or within a second range of AC input voltages or from a DC input voltage comprising:

means for sensing between an AC or a DC input voltage;

means for converting a DC input voltage to an AC voltage;

means for sensing either the AC input voltage or the converted AC voltage to determine if its magnitude is within said first or second range of voltages; and means for connecting a plurality of devices for transferring electrical energy in parallel with the sensed AC input voltage or the converted AC voltage whenever the sensed voltage has a magnitude within said first range of voltages and in series with said sensed voltage whenever the sensed voltage has a magnitude within said second range of voltages, said plurality of devices producing an AC output voltage.

22. The device as claimed in claim 21 further including means for converting the AC voltage from said plurality of transfer devices to a DC output voltage.

23. A device for producing a DC output voltage from an input voltage which is within a first range of AC voltages or within a second range of AC input voltages or from a DC input voltage comprising:

means for sensing the input voltage to determine if it is an AC or a DC input voltage;

means for coupling a sensed DC input voltage to a pair of output terminals;

means for sensing the AC input voltage to determine if its magnitude is within said first or second range of voltages; and means for connecting a plurality of devices for transferring electrical energy in parallel with the sensed AC input voltage whenever the sensed voltage has a magnitude within said first range of voltage and in series with said sensed voltage whenever the sensed voltage has a magnitude within said second range of voltages, said plurality of devices producing an AC voltage;

means for converting the AC voltage from said plurality of transfer devices to a converted DC voltage; and means for coupling said converted DC voltage to said pair of output terminals whenever the sensed input voltage is an AC voltage.

24. A method for producing an output voltage which is within a first range of voltages from an AC or DC input voltage which is within the first range of voltages or within a second range of voltages comprising:

sensing the input voltage to determine whether it is an AC or a DC input voltage;

converting a DC input voltage to an AC voltage;

sensing an AC input voltage or a converted AC voltage to determine if its magnitude is within said first or second range of voltages; and connecting a plurality of electrical loads in parallel with an AC input voltage or a converted AC voltage whenever the sensed AC input voltage or converted AC voltage has a magnitude within said first range of voltages or connecting said electrical loads in series with said AC input voltage or converted AC voltage whenever the sensed AC input voltage or converted AC voltage is within said second range of voltages, said electrical loads comprising at least two primary windings and at least one secondary winding of a transformer, said plurality of loads producing an output voltage.

25. The method as claimed in claim 24 wherein the step of connecting a pair of electrical loads is followed by the step of converting the AC voltage from said secondary winding to a DC output voltage.

26. A method for producing an output voltage which is within a first range of voltages from an AC or DC input voltage which is within the first range of voltages or within a second range of voltages comprising:

sensing the input voltage to determine whether it is an AC or a DC input voltage;

switching a sensed DC input voltage to a pair of output terminals or switching an an AC input voltage; or sensing an AC input voltage or a converted AC voltage to determine if its magnitude is within said first or second range of AC voltages;

connecting a plurality of electrical loads in parallel with an AC input voltage or a converted AC voltage whenever the sensed AC input voltage or converted AC voltage has a magnitude within said first range of voltages or connecting said electrical loads in series with said AC input voltage or converted AC voltage whenever the sensed AC input voltage or converted AC voltage is within said second range of voltages, said electrical loads comprising at least two primary windings and at least one secondary winding of a transformer, said plurality of loads producing an output voltage;

converting the AC voltage from said secondary winding to a converted DC voltage; and switching said converted DC voltage to said pair of output terminals whenever the sensed input voltage is an AC voltage.

27. A device for automatically producing an AC output voltage which is within a first range of voltages from an AC voltage which is within the first or second range of AC voltages or from a DC input voltage which is within a third or a fourth range of DC voltages comprising:

means for converting a DC input voltage to an AC voltage;

said DC converter converting a DC voltage in said third range to converted AC voltage in said first range and converting a DC input voltage in said fourth range to a converted AC voltage in said second range;

means for sensing the AC input voltage or converted AC voltage to determine if its magnitude is within said first or second range of AC voltages; and means for connecting a plurality of electrical loads in parallel with the input voltage whenever the sensed input voltage has a magnitude within said first range of AC voltages and in series with said input voltage whenever the sensed input voltage is within said second range of AC voltages, said electrical loads comprising at least two primary windings and at least one secondary winding of a transformer, said secondary winding producing said AC voltage.

28. The device as claimed in claim 27 wherein the input voltage is an AC or a DC voltage and further including means for sensing the input voltage to determine whether it is an AC or a DC input voltage and means for converting a DC input voltage to an AC voltage and wherein said sensing means senses the AC input voltage or the converted AC voltage to determine its magnitude and wherein said connecting means connects the converted AC voltage to said pair of electrical loads whenever the input voltage is a DC voltage or connects an AC input voltage to said plurality of electrical loads.

29. The device as claimed in claim 28 and further including means for converting the AC voltage from said secondary winding to a DC output voltage.

30. A device for automatically producing an output voltage which is within a first range of voltages from an AC voltage which is within a first or a second range of AC voltages or from a DC input voltage comprising:

means for sensing the input voltage to determine whether it is an AC or a DC voltage;

means for switching a sensed DC voltage to a pair of output terminals;

means for sensing an AC input voltage to determine if its magnitude is within said first or second range of AC voltages; and means for connecting a plurality of electrical loads in parallel with the sensed input AC voltage whenever the sensed input AC voltage has a magnitude within said first range of AC voltages and for connecting said electrical loads in series with the sensed input AC voltage whenever the sensed input AC voltage is within said second range of AC voltages, said electrical loads comprising at least two primary windings and at least one secondary winding of a transformer, said secondary winding producing an AC output voltage; and means for converting the AC output voltage from said secondary winding to a DC voltage, said switching means switching said AC output voltage to said pair of output terminals whenever the sensed input voltage is an AC voltage or switching said DC input voltage to said output terminals.

* * * * *